United States Patent

Henn et al.

Patent Number: 5,789,658
Date of Patent: Aug. 4, 1998

[54] ADAPTATION METHOD FOR CORRECTING TOLERANCES OF A TRANSDUCER WHEEL

[75] Inventors: Michael Henn, Billigheim/Baden; Anton Angermaier, Thann, both of Germany

[73] Assignee: Siemens Aktiengesellschaft, Munich, Germany

[21] Appl. No.: 742,249

[22] Filed: Oct. 31, 1996

[30] Foreign Application Priority Data

Oct. 31, 1995 [DE] Germany ............ 195 40 674.5

[51] Int. Cl.[6] ............................................. G01M 15/00
[52] U.S. Cl. ............................................. 73/1.37; 73/116
[58] Field of Search ........................ 73/1.37, 116, 117.3; 364/431.07, 571.02; 324/207.25

[56] References Cited

U.S. PATENT DOCUMENTS

| 5,117,681 | 6/1992 | Dosdall et al. ........... 73/116 |
| 5,237,862 | 8/1993 | Magrulkar et al. ........ 73/116 |
| 5,377,535 | 1/1995 | Angermaier et al. ....... 73/116 |
| 5,428,991 | 7/1995 | Klenk et al. ............ 73/116 |

FOREIGN PATENT DOCUMENTS

| 0 583 495 | 2/1994 | European Pat. Off. . |
| 41 33 679 | 4/1993 | Germany . |
| 44 06 606 | 9/1995 | Germany . |
| 50667 | 3/1987 | Japan ............ 73/1.37 |
| 1054265 | 3/1989 | Japan ............ 73/1.37 |
| 15337 | 12/1990 | WIPO ............ 73/1.37 |

*Primary Examiner*—Hezron E. Williams
*Assistant Examiner*—Nashmiya Fayyaz
*Attorney, Agent, or Firm*—Herbert L. Lerner; Laurence A. Greenberg

[57] ABSTRACT

An adaptation method for correcting tolerances of a transducer wheel includes determining a correction factor for each individual tooth or each segment of the transducer wheel by measuring angular speed while taking into account both production tolerances and variations from one manufactured part to another of its kind as well as noncentral support of the transducer wheel on the shaft. The correction factor also compensates for a mass moment caused by a piston and a connecting rod. In an adaptation algorithm, a periodic disturbance by a gas moment caused by varying cylinder pressures and a moment fed back from the road are taken into account.

9 Claims, 5 Drawing Sheets

TOOTH OR SEGMENT INDEX

TOOTH INDEX j

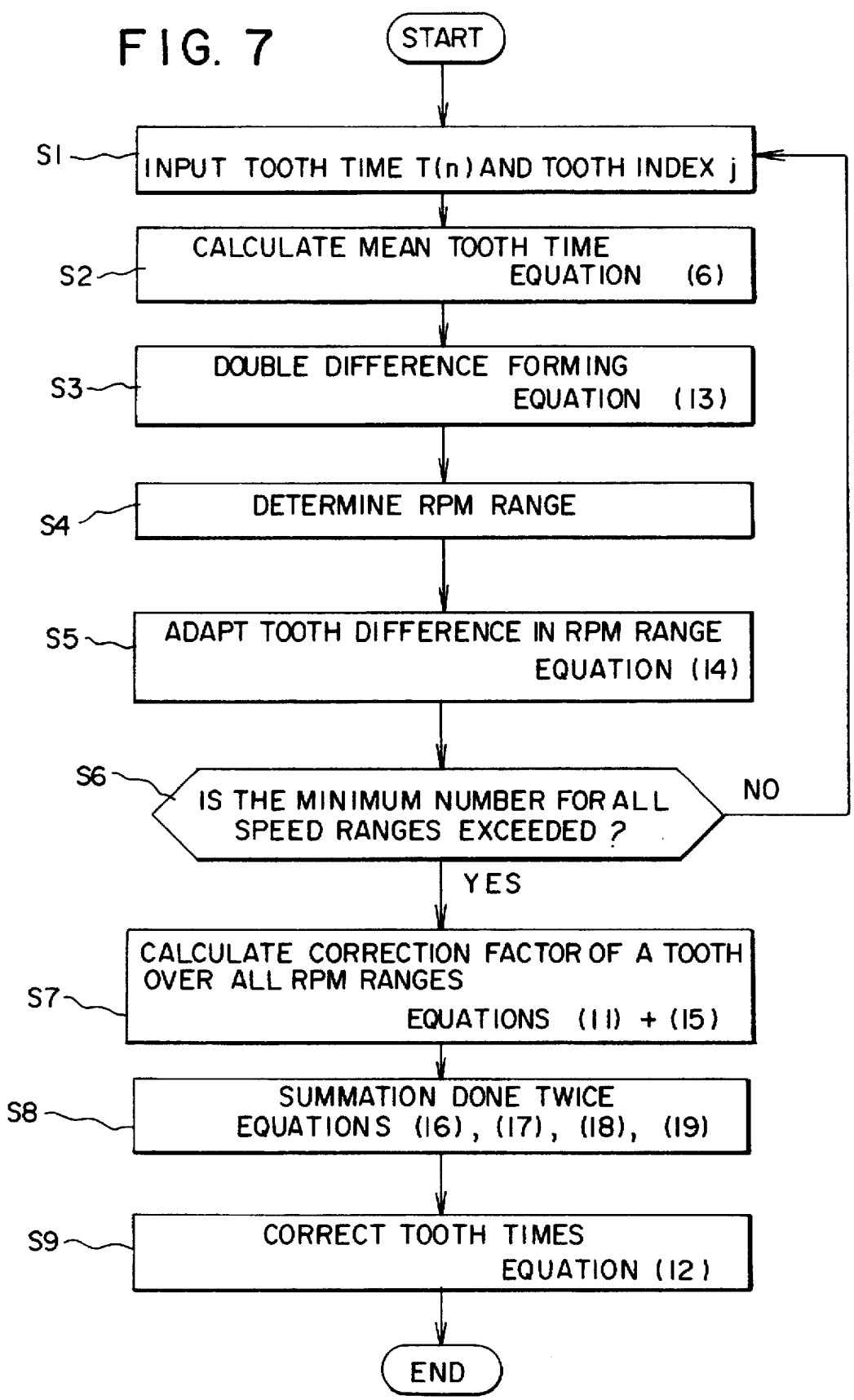

5,789,658

ADAPTATION METHOD FOR CORRECTING TOLERANCES OF A TRANSDUCER WHEEL

BACKGROUND OF THE INVENTION

Field of the Invention

The invention relates to an adaptation method for correcting tolerances of a transducer wheel, especially a crankshaft transducer wheel of an internal combustion engine, having a number of teeth with mutual spacings being scanned by a pickup, the pickup furnishing a pulse train having a chronological spacing being measured for each tooth or for a segment encompassing a plurality of teeth and being corrected in operating states of the internal combustion engine involving overrunning shutoff.

In order to detect the position of a shaft, such as the crankshaft or camshaft of an internal combustion engine, it is known to provide a transducer disk or transducer wheel on the shaft. The disk or wheel has markings, such as teeth, which are scanned by a fixed pickup. In the pickup, for instance an inductive pickup, voltage pulses are induced by the markings traveling past the pickup, and in a downstream evaluation circuit, the rpm or angular speed of the shaft is ascertained from the time intervals between those voltages pulses.

The angular speed of the crankshaft or of an engine shaft connected to it can be used, for instance, to detect combustion misfires. Combustion misfires of single or multiple cylinders cause the angular speed of the crankshaft to slow. Since the measurement effect is very slight, especially at higher rpm, considering that the rpm loss in the event of a combustion misfire can amount to only 0.2% in an extreme case, the angular speed has to be measured very precisely. Tolerances and variations from one specimen to another in production or when the transducer wheel is mounted on the crankshaft cause inaccuracies in measurement of the angular speed and thus mistakes in detecting combustion misfires.

Published European Patent Application 0 583 495 A1 discloses a method for detecting and correcting errors in time measurement of rotating shafts, in particular crankshafts or shafts connected to them. Segment times are measured that the shaft needs in order to rotate by a defined angular span, known as a segment, and then those times are compared with a time which is applicable to a reference segment. A correction value is ascertained as a function of the time difference, that enables correction of the measured segment time either for individual cylinders or individual segments. In order to preclude undesired influences in error detection and error correction that can be caused by engine ignition and combustion misfires, the measurements are performed during the operating state of overrunning shutoff.

German Published, Non-Prosecuted Patent Application DE 41 33 679 A1 describes a method for adapting mechanical tolerances of a transducer wheel, with the aid of which the inaccuracies of the individual segments that occur in the production of such a transducer wheel are corrected electronically. To that end, once engine overrunning is detected, or in other words no rpm fluctuations occur, the duration of the intervals between two segment edges of the same polarity are measured, and the values thus obtained are stored in memory. Those values (time intervals) are a measure for the various segment lengths and are taken into account in the calculations performed during normal engine operation, for exact rpm ascertainment. To that end, the second and successive time intervals are referred to the first time interval, the deviations from one another are filtered out, and the filtered measured values are used as adaptation values.

SUMMARY OF THE INVENTION

It is accordingly an object of the invention to provide an adaptation method for correcting tolerances of a transducer wheel, which overcomes the hereinafore-mentioned disadvantages of the heretofore-known methods of this general type and which enables even more accurate correction of the angular speed of a shaft measured through the use of a transducer wheel and an associated pickup, as compared with the known prior art.

With the foregoing and other objects in view there is provided, in accordance with the invention, in an adaptation method for correcting tolerances of a transducer wheel, especially a crankshaft transducer wheel of an internal combustion engine, which includes scanning spacings between a number of mutually spaced apart teeth of the transducer wheel with a pickup furnishing a pulse train, measuring a chronological spacing of the pulse train for each tooth or for a segment encompassing a plurality of teeth, and correcting the chronological spacing in overrunning shutoff operating states of the engine, the improvement which comprises calculating a mean tooth time from currently measured tooth time or segment time values; standardizing the current tooth time values to the mean tooth time; determining an rpm range in which the engine is operating; ascertaining an adaptation factor for each tooth in dependence on the ascertained rpm range; correcting the adaptation factor belonging to every $j^{th}$ tooth in an $i^{th}$ rpm range with the standardized tooth times; calculating a correction factor for each tooth or each segment from the corrected adaptation factor; and correcting a $j^{th}$ tooth time value with the correction factor.

In accordance with another mode of the invention, there is provided a method which comprises defining an rpm range in which the engine is already operating at the mean tooth time.

In accordance with a further mode of the invention, there is provided a method which comprises calculating the corrected adaptation factors by the equation:

$$\alpha_{ij,new} = (1-\alpha)\alpha_{ij,old} + \alpha(T_{norm}(n))$$

in which:

$\alpha$ is a filter factor determining an adaptation rate and noise suppression and $0<\alpha<1$; $\alpha_{ij,old}$ is the adaptation factor; $\alpha_{ij,new}$ is the corrected adaptation factor; and $T_{norm}(n)$ is the standardized tooth time.

In accordance with an added mode of the invention, there is provided a method which comprises calculating the correction factor from the corrected adaptation factors in accordance with the equation:

$$\gamma_j = C_1 \sum_{i=1}^{N} \alpha_{ij} - C_2 \sum_{i=1}^{N} \overline{T_i^2} \alpha_{ij}, j = 1 \ldots Z$$

with previously determined weighting factors:

$$C_1 = \frac{\sum_{i=1}^{N} \overline{T_i^4}}{N \sum_{i=1}^{N} \overline{T_i^4} - \left(\sum_{i=1}^{N} \overline{T_i^2}\right)^2}$$

and

-continued $$C_2 = \frac{\sum\limits_{i=1}^{N} \overline{T_i^2}}{N \sum\limits_{i=1}^{N} \overline{T_i^4} - \left(\sum\limits_{i=1}^{N} \overline{T_i^2}\right)^2}, \text{ where:}$$

$\gamma_j$ the correction factor; $\alpha$ is a filter factor; and $\overline{T}_i$ is the rpm range.

In accordance with an additional mode of the invention, there is provided a method which comprises correcting the tooth times with the correction factor in accordance with the equation: $T_{corr}(n)=T(n)(1+\gamma_j)$, where $T(n)$ is the tooth time; and $\gamma_j$ is the correction factor.

With the objects of the invention in view there is also provided, in an adaptation method for correcting tolerances of a transducer wheel, especially a crankshaft transducer wheel of an internal combustion engine, which includes scanning spacings between a number of mutually spaced apart teeth of the transducer wheel with a pickup furnishing a pulse train, measuring a chronological spacing of the pulse train for each tooth or for a segment encompassing a plurality of teeth, and correcting the chronological spacing in overrunning operating states of the engine, the improvement which comprises calculating a mean tooth time from currently measured tooth time or segment time values; calculating a differential variable in accordance with the equation:

$$T_{diff}(n) = \frac{T(n) - 2T(n-1) + T(n-2)}{\overline{T}}, \text{ in which:}$$

$T_{diff}(n)$ is the differential variable, $T(n)$ is the currently measured tooth time or segment time value, and $\overline{T}$ is the mean tooth time; determining an rpm range in which the engine is operating; ascertaining an adaptation factor for each tooth depending on the ascertained rpm range; correcting a $j^{th}$ tooth difference in an $i^{th}$ rpm range with the differential variable; calculating a correction factor for each tooth or each segment from the corrected adaptation factors; and correcting a $j^{th}$ tooth time value with the correction factor.

In accordance with a concomitant mode of the invention, there is provided a method which comprises calculating the corrected adaptation factors by the equation:

$$b_{ij,new}=(1-\alpha)b_{ij,old}+\alpha(T_{norm}(n)),$$

in which $\alpha$ is a filter factor determining an adaptation rate and noise suppression and $0<60<1$; $b_{ij,old}$ is the adaptation factor; $b_{ij,new}$ is the corrected adaptation factor; and $T_{norm}(n)$ is a standardized tooth time value.

By determining a correction factor for each individual tooth or segment of the transducer wheel during operation of the engine and for adaptation of these correction values, for instance, during overrunning, while injection to the cylinders is shut off, highly accurate values for the angle speed are obtained, which can be appropriately used, for instance, to detect combustion misfires or to determine the torque. The correction factor takes into account the influence of production tolerances and variations from one transducer wheel to another, and in particular its teeth, as well as a noncentral mounting on the shaft having an rpm to be studied.

In addition, the correction factor compensates for the mass moment resulting from the piston and the connecting rod. In the adaptation algorithm, periodic perturbation by the gas moment, caused by varying cylinder pressures, and by the moment fed back from the road, is taken into account.

Other features which are considered as characteristic for the invention are set forth in the appended claims.

Although the invention is illustrated and described herein as embodied in an adaptation method for correcting tolerances of a transducer wheel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 7 is a flow chart of a second exemplary embodiment for correcting the tolerances of the transducer wheel.

DESCRIPTION OF THE PREFERRED EMBODIMENTS

Figure 1:
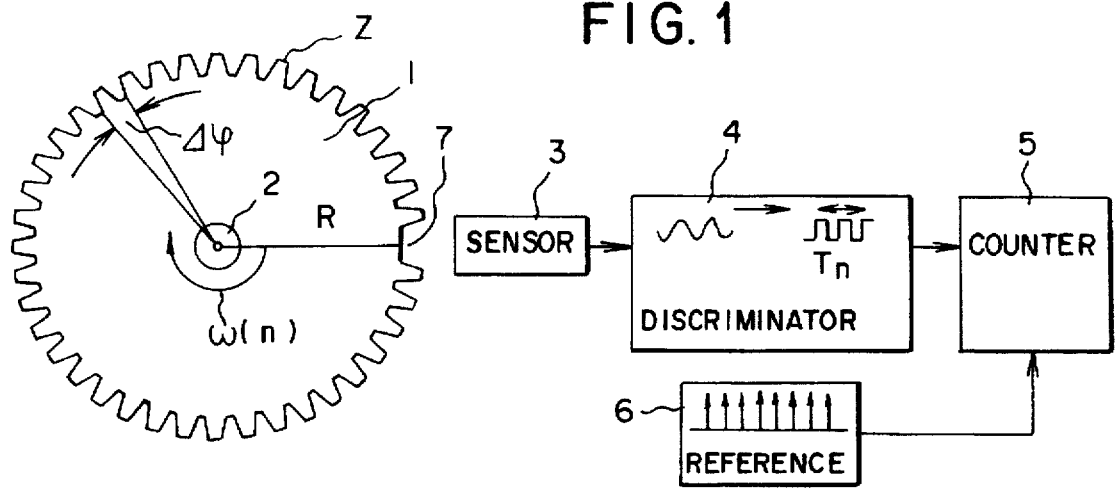
FIG. 1 is a diagrammatic, elevational view of a transducer gear wheel with a block diagram illustrating a measurement principle for angular speed.

Referring now to the figures of the drawings in detail and first, particularly, to FIG. 1 thereof, it is seen that reference numeral 1 identifies a transducer gear wheel which has ferromagnetic teeth with angle increments of a width $\Delta\phi$ and which is mounted on a crankshaft 2. Through the use of a magnetic pickup 3, for instance a Hall sensor or an inductive sensor, a voltage signal is generated during the rotary motion of the crankshaft 2. This signal fluctuates with the spacing of the gear wheel end surface. The gear wheel thus forms the modulator for converting the amplitude-analog input variable of angular speed into a frequency-analog signal. The zero crossings of this signal likewise contain the information about the instantaneous angle. As a result of the succession of tooth gaps and ferromagnetic teeth of the transducer gear wheel 1, the magnetic field varies. This field originates in a permanent magnet in the sensor 3.

A gear wheel with Z teeth and a radius R is typically identified by its modulus $$m = \frac{2R}{Z}.$$

In the case of an adequately strong magnetic field change for obtaining a signal, only moduluses within certain limits are allowable for the magnetic sensors. For a given radius R, this means a limitation of the maximum number of teeth Z and therefore of the maximum angle resolution. An angle increment is equal to $$\Delta \phi = \frac{2R}{Z}.$$

From the signal furnished by the sensor 3, a discriminator 4 which may, for instance, include a Schmitt trigger and an edge detector, generates a square wave signal, which is characterized by the spacing between two edges T(n) (period length). The digitizing of this signal is performed with the aid of a counter 5 and a reference frequency 6. The counter state thus obtained, at $$ZS = \frac{\Delta \phi}{T(n)}$$

is a measure for the angular speed ω. By cutting out one or more teeth on the transducer gear wheel 1, a region 7 is obtained for an angle reference, with the aid of which the absolute angle can be determined. Sixty teeth minus one gap of two teeth has come to be established as a standard for pulse transducers on the crankshaft of internal combustion engines.

On the assumption of a rigid crankshaft, the following mass balance at the crankshaft applies:

$$\Theta \omega = M_{gas} - M_{mass} - M_{load} \tag{1}$$

In this case, Θ is the mass inertia of the crankshaft; ω is the angular acceleration; $M_{gas}$ is the gas moment which is often also called the pressure moment and is caused by the varying cylinder pressures; $M_{mass}$ is the mass moment caused by the oscillating masses of the piston and connecting rod; and $M_{load}$ is the load moment fed back from the road.

An angular-dependent periodic function $f(\phi)$, which determines the shape, and the instantaneous angular speed ω, which determines the amplitude, are incorporated into the mass moment $M_{mass}$:

$$M_{mass} = f(\phi) \omega^2 \tag{2}$$

In this case, $f(\phi)$ is defined by construction specifications of the engine. The mass moment $M_{mass}$ includes no information about the engine operating state, or in other words no information as to whether combustion has occurred or not, and in this case is a perturbation, while the gas moment $M_{gas}$ permits a statement to be made about the combustion process.

If the transducer gear wheel 1 upon being mounted on the crankshaft 2 is not adjusted precisely centrally, then a superposition of fluctuations occurs, with the period of one revolution, in the measured speed. The sensor 3 measures the tangential speed v(φ), with which the teeth Z of the transducer gear wheel 1 move past, and does not measure the angular speed ω(φ).

The speed at the location of the sensor is defined by v(φ)=v(φ)=r(φ)ω(φ).

Figure 2:
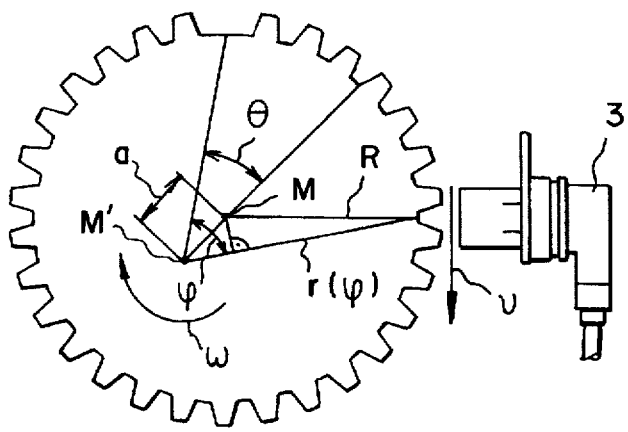
FIG. 2 is an elevational view of a transducer gear wheel and a sensor for explaining gear wheel geometry given a noncentral support of the transducer wheel.

FIG. 2 shows the geometric conditions if the transducer gear wheel 1 is not centrally supported on the crankshaft 2.

In order to provide ideal support and therefore ideal measurement, the geometric center M of the transducer gear wheel 1 matches the rotary axis M'. Thus the radius r(φ)=R is constant, and the course over time of the tangential speed v(φ) before the sensor 3 corresponds to the course of the angular speed ω(φ), except for the factor R. If the geometric center M and the rotary axis M' are offset from one another, then the radius r(φ) varies. In the case of a small relative offset $$q = \frac{\alpha}{R}$$

of the axes, where α designates the axis offset between the center M and the rotary axis M', the angular dependency of the radius can be approximated by the following equation:

$$r(\phi) = R(1 + q \cos(\phi - \Theta)) \tag{3}$$

This produces a periodic error component in the measured angular speed, as a result of the noncentral support, amounting to $$\omega_{uc}(\phi) = \omega q \cos(\phi - \Theta) \tag{4}$$

Another error source of the transducer gear wheel in measuring the angular speed is production tolerances of the teeth of the transducer wheel. The angular pitch of the gear wheel is not exact as a result, and the actual increment width $\Delta \phi_Z(n)$ of an angle increment is not a constant $\Delta \phi$.

Figure 3:
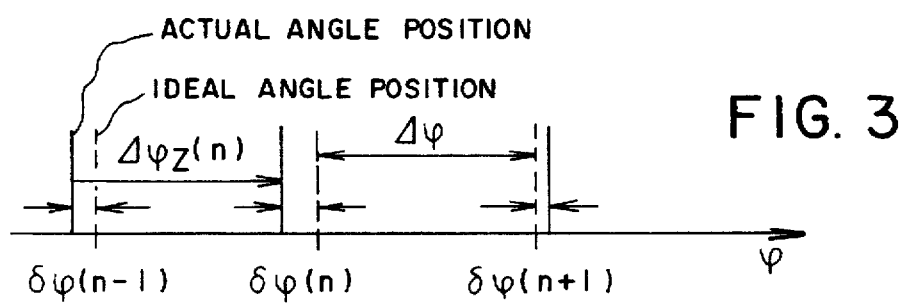
FIG. 3 is a diagram showing an angular error from production tolerances.

From FIG. 3, one finds for the actual angle increment $$\Delta \phi_Z(n) = \Delta \phi + \delta \phi_e(n) = \Delta \phi + \delta \phi(n) - \delta \phi(n-1), \tag{4a}$$

where $\Delta \phi$ designates the absolute angle and $\delta \phi_e(n)$ designates the angle error resulting from the production tolerances of the transducer wheel. The angular error repeats after one revolution, that is $\delta \phi(n+Z) = \delta \phi(n)$.

The fluctuations in the angular speed are caused by moment fluctuations, that is by the moments acting upon the crankshaft and the errors in measuring the angular speed. In a small signal approximation, they can all be recalculated to fluctuations in the measured length of time t(n) between two teeth or segments:

$$T(n) = \overline{T} + \delta T_e(n) - \overline{T} \frac{\delta \phi_e(n)}{\Delta \phi} - \overline{T}q \cos\left(\left(n - \frac{1}{2}\right) \Delta \phi - \Theta\right) - \overline{T} \frac{\Delta \phi(n)}{\Theta} - \overline{T}^3 \frac{M_{gas}(n)}{\Delta \phi \Theta} - \overline{T}^3 \frac{M_{load}(n)}{\Delta \phi \Theta}. \tag{5}$$

where in this formula, in addition, $\delta T_e(n)$ indicates the stochastic digitization error caused by the limited resolution of the reference stroke for the counter. The mean length of time $\overline{T}$ can be calculated, for instance, over one revolution. In other words, it can be calculated as the time until the same tooth of the transducer gear wheel again moves past the sensor. Where there are Z teeth or segments, this time becomes $$\overline{T} = \frac{1}{Z} \sum_{n-Z/2}^{n+Z/2-1} T(n) \tag{6}$$

The goal of the adaptation phase is then to determine all of the periodically recurring perturbation components for a certain tooth or a certain segment. If equation (5) is converted, by subtracting the mean value $\overline{T}$ from the current value T(n) and standardizing it to the mean value $\overline{T}$, the tooth error, the error from noncentral support, and the mass moment can be combined to make a correction factor γ(n). This factor is constant for the particular tooth or segment and can be used to correct the angular speed.

Figure 4:
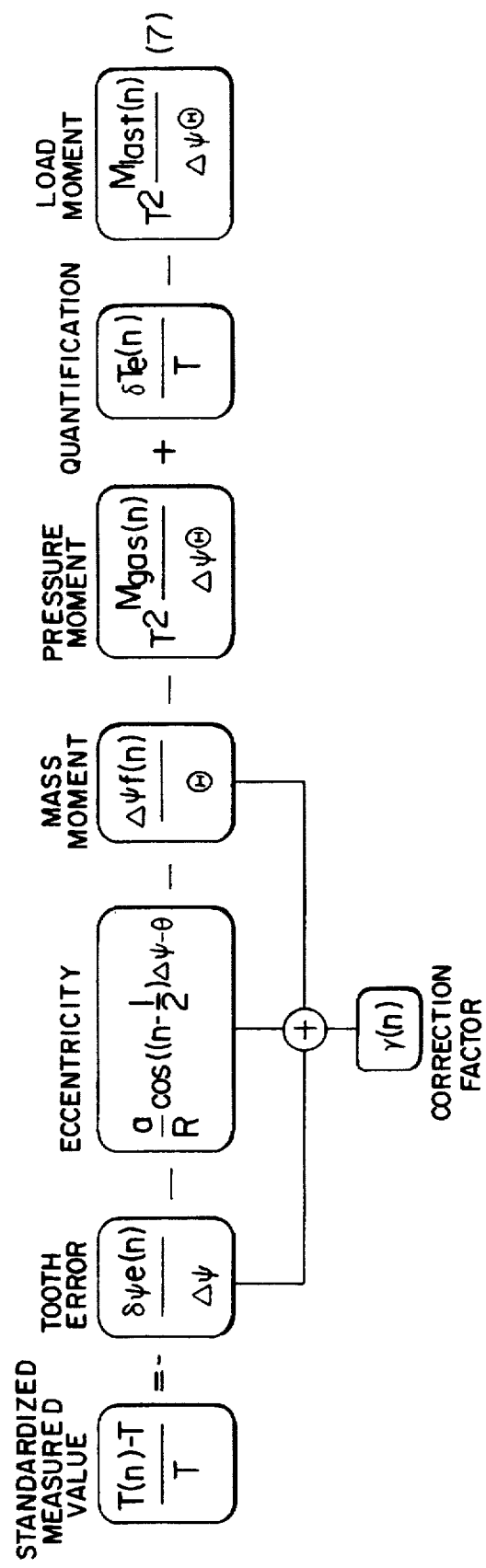
FIG. 4 is a block circuit diagram showing proportions of perturbation in measuring angular speed.

In FIG. 4, this relationship is shown graphically (equation 7).

The digitization error and the load moment are not periodic over one revolution. Their contribution to a certain tooth is a stochastic perturbation and can be suppressed by way of an averaging process. Conversely, the pressure moment is likewise periodic when engine ignition is off. Moreover, it is dependent on the opening point of the engine. If the throttle valve is closed, the course of the gas moment (pressure moment) $M_{gas}(n)$ is maximally independent of the rpm, but it does affect the fluctuations of the tooth times, weighted by the factor $\overline{T}^2$.

The equation shown graphically in FIG. 4 can thus be converted to the following $$\frac{T(n) - \overline{T}}{\overline{T}} = -1\gamma(n) - \frac{\overline{T}^2}{\Delta \phi \Theta} - M_{gas}(n) + e(n) \tag{8}$$

with $$e(n) = \frac{\delta T_e(n)}{\overline{T}} - \overline{T}^2 \frac{M_{load}(n)}{\Delta \phi \Theta} .$$

This dependency of the various influencing variables on the operating point is utilized below in order to separate the desired correction factor $\gamma(n)$ of a tooth from the proportion of the pressure moment.

The ascertainment of the correction factor will be described in further detail with reference to a flowchart of FIG. 5. The method will be called up whenever the engine is in the coasting mode with the injection shutoff and the throttle valve closed. Such an operating state exists in overrunning. In a first step S1, the current tooth or segment time value T(n) and the corresponding index j (corresponding to an absolute angle) are entered. Next, according to equation (6), the mean tooth time $\overline{T}$ is calculated, and in step S3 a standardization of the current tooth time value T(n) is carried out in accordance with the equation $$T_{norm}(n) = -\frac{T(n) - \overline{T}}{\overline{T}} \tag{9}$$

Figure 6:
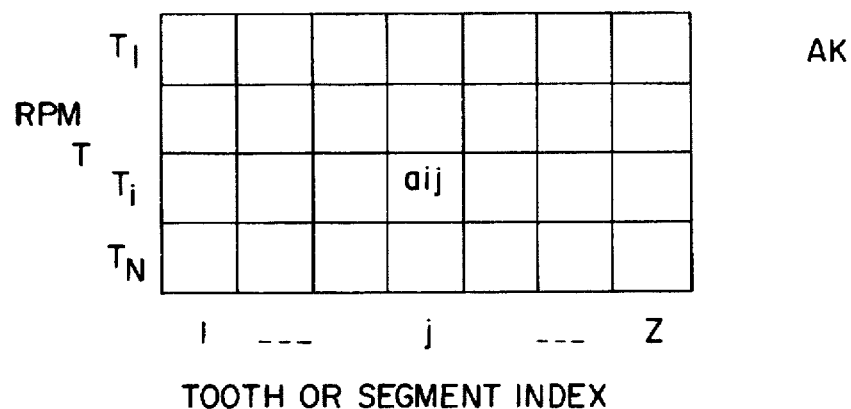
FIG. 6 is an adaptation performance graph.

In step S4, it is determined what rpm range $\overline{T}_i$ the engine is in at the moment. This is necessary, since different fluctuations in the tooth times occur in the various rpm ranges. To that end, an adaptation performance graph AK is stored in a memory of an electronic control unit of the engine. In this graph, for each tooth $1 \ldots j \ldots Z$, an adaptation value $(\alpha_{ij})$ can be determined, as a function of fixedly defined rpm ranges (see FIG. 6).

The standardized tooth time fluctuations $T_{norm}(n)$ of equation 9 are used in step S5 for adapting the $j^{th}$ tooth in the $i^{th}$ rpm range, in accordance with the following calculation formula:

$$\alpha_{ij,new} = (1-\alpha)\alpha_{ij,old} + \alpha(T_{norm}(n)) \tag{9a}$$

where $\alpha_{ij,old}$: is the old adaptation value $\alpha_{ij,new}$: is the new adaptation value $\alpha$: is the filter factor ($0<\alpha<1$), which determines the adaptation speed and the noise suppression.

The thus-obtained new adaptation values $\alpha_{ij,new}$ are entered into the adaptation performance graph AK, by overwriting the old values $\alpha_{ij,old}$. In step S6, it is then asked whether or not a predeterminable minimum number of iterations (such as fifty) for each of the rpm ranges has been attained. If the answer to this question is negative, then the method is continued with step S1. Otherwise, in step S7, the correction factor $\gamma_j$ of the $j^{th}$ tooth is calculated over all rpm ranges in accordance with a linear regression formula:

$$\gamma_j = C_1 \sum_{i=1}^{N} \alpha_{ij} - C_2 \sum_{i=1}^{N} \overline{T}_i^2 \alpha_{ij}, \quad j = 1 \ldots Z \tag{10}$$

With the previously determined weighting factors $$C_1 = \frac{\sum_{i=1}^{N} \overline{T}_i^4}{N \sum_{i=1}^{N} \overline{T}_i^4 - \left( \sum_{i=1}^{N} \overline{T}_i^2 \right)^2} \tag{11}$$

and $$C_2 = \frac{\sum_{i=1}^{N} \overline{T}_i^2}{N \sum_{i=1}^{N} \overline{T}_i^4 - \left( \sum_{i=1}^{N} \overline{T}_i^2 \right)^2}$$

With the correction factor $\gamma_j$, after the adaptation phase is ended, in step S8 the tooth times of the $j^{th}$ tooth are corrected in accordance with the relation $$T_{corr}(n) = T(n)(1+\gamma_j) \tag{12}$$

In FIG. 7, a further exemplary embodiment for an adaptation algorithm is shown in the form of a flowchart. In this case, instead of the standardized tooth fluctuations $T_{norm}$, a different intermediate variable is used. The two first steps S1 and S2 are identical to the steps of the method described above in conjunction with FIG. 5.

In order to suppress the influence of acceleration or braking events during the adaptation phase, the differential variable $$T_{diff}(n) = \frac{T(n) - 2T(n-1) + T(n-2)}{\overline{T}} \tag{13}$$

is calculated in step S3.

Figure 5:
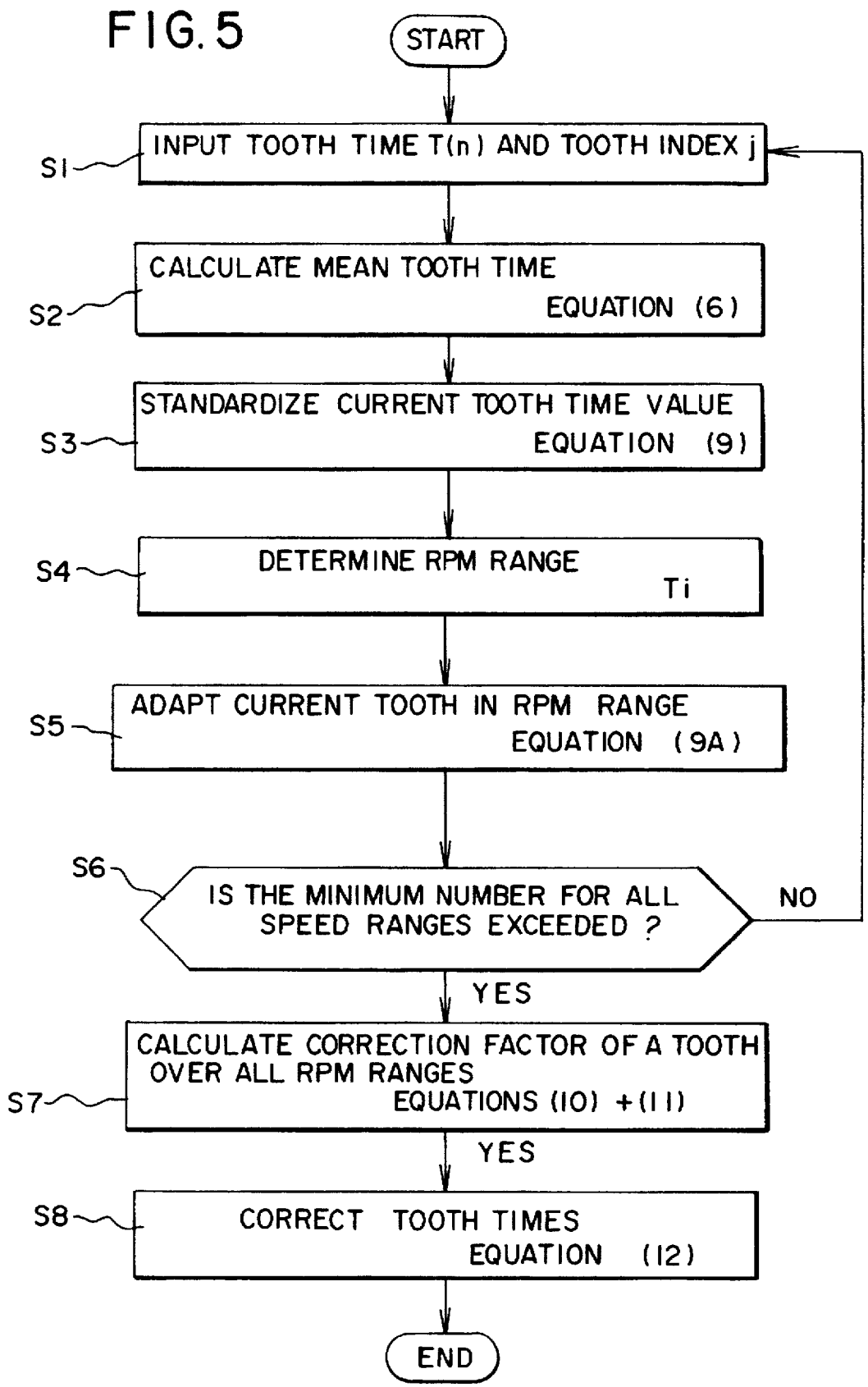
FIG. 5 is a flow chart of a first exemplary embodiment for correcting tolerances of the transducer wheel.

Next, analogous to step S4 in FIG. 5, the rpm range is determined. The differential variable according to equation (13) is used in step S5 to adapt the $j^{th}$ tooth difference in the $i^{th}$ rpm range, in accordance with the relation $$b_{ij,new} = (1-\alpha)b_{ij,old} + \alpha T_{diff}(n) \tag{14}$$

In this case, $\alpha$ designates the filter factor again, analogous to the method of FIG. 5. If a minimum number of iterations for each of the rpm ranges has been met (question in step S6), then in step S7, an intermediate variable $\delta$ for the $j^{th}$ tooth is calculated in accordance with a linear regression formula:

$$\delta_j = C1 \sum_{i=1}^{N} b_{ij} - C2 \sum_{i=1}^{N} \overline{T}_i^2 b_{ij} \quad j = 1, \ldots, Z \tag{15}$$

The weighting factors C1 and C2 are identical to the factors as given in equation (11).

From these intermediate variables $\delta j$, after a cumulative addition is performed twice, one obtains auxiliary variables $\epsilon_j$ and from that the correction factors $\gamma_j$ are obtained (step S8):

$$\epsilon_j^* = \sum_{k=1}^{j} \delta_k, \quad j = 1, \ldots, Z \tag{16}$$

-continued $$\epsilon_j = \epsilon_j^* - \frac{1}{Z} \sum_{k=1}^{Z} \epsilon_k^*, \quad j = 1, \ldots, Z \quad (17)$$

$$\gamma_j^* = \sum_{k=1}^{j} \epsilon_k, \quad j = 1, \ldots, Z \quad (18)$$

$$\gamma_j = \gamma_j^* - \frac{1}{Z} \sum_{k=1}^{Z} \gamma_k^*, \quad j = 1, \ldots, Z \quad (19)$$

The calculations according to equations (17) and (19) assure that the correction factors over one revolution again become free of average values.

In step S9, after the ending of the adaptation phase, the tooth times of the $j^{th}$ tooth are corrected, in accordance with equation (12), analogously to the method of FIG. 5.

Figure 8:
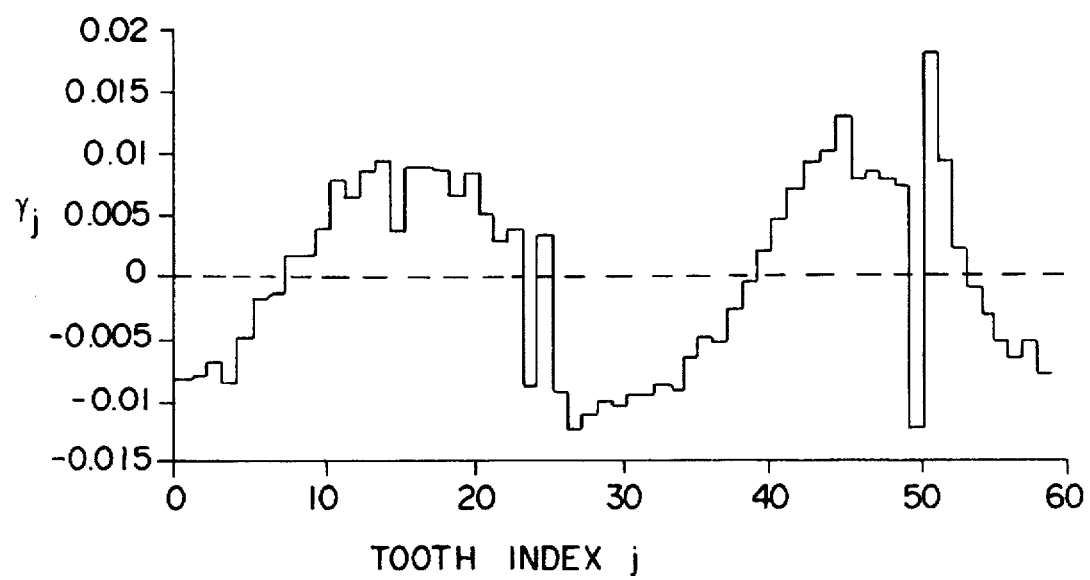
FIG. 8 is a graph of correction values for individual teeth of the transducer wheel.

In FIG. 8, the result of an adaptation is shown where a transducer gear wheel with 58+2 teeth is used, that is one gear wheel with 58 teeth and one gap two teeth wide, to determine the absolute angular position when a differential Hall sensor is used as the magnetic pickup. The tooth index j is plotted on the abscissa, and the adapted correction values $\gamma_j$ are plotted on the ordinate.

We claim:

1. In an adaptation method for correcting tolerances of a transducer wheel connected to a crankshaft of an engine, which includes:

scanning spacings between a number of mutually spaced apart teeth of the transducer wheel with a pickup furnishing a pulse train, measuring a chronological spacing of the pulse train for each tooth or for a segment encompassing a plurality of teeth, and correcting the chronological spacing in overrunning operating states of the engine, the improvement which comprises:

calculating a mean tooth time from currently measured tooth time values or segment time values;

standardizing the current tooth time values to the mean tooth time defining standardized tooth times;

determining an rpm range in which the engine is operating;

ascertaining an adaptation factor for each tooth in dependence on the ascertained rpm range;

correcting the adaptation factor belonging to every $j^{th}$ tooth in an $i^{th}$ rpm range with the standardized tooth times defining a series of corrected adaptation factors;

calculating a correction factor for each tooth or each segment from the corrected adaptation factors; and correcting a $j^{th}$ tooth time value with the corresponding correction factor.

2. The method according to claim 1, which comprises correcting the tooth time values with the correction factor for each tooth in accordance with the equation:

$$T_{corr}(n) = T(n)(1 + \gamma_j),$$

where:

T(n) are the tooth time values; and $\gamma_j$ is the correction factor for each tooth.

3. The method according to claim 1, which comprises defining an rpm range in which the engine is already operating at the mean tooth time.

4. The method according to claim 1, which comprises calculating the corrected adaptation factors by the equation:

$$\alpha_{j,new} = (1-\alpha)\alpha_{j,old} + \alpha(T_{norm}(n))$$

in which:

$\alpha$ is a filter factor determining an adaptation rate and noise suppression and $0 < \alpha < 1$;

$\alpha_{ij,old}$ is the adaptation factor for each tooth;

$\alpha_{ij,new}$ is the corrected adaptation factor for each tooth; and $T_{norm}(n)$ are the standardized tooth times.

5. The method according to claim 1, which comprises calculating the correction factor for each tooth from the corrected adaptation factors in accordance with the equation:

$$\gamma_j = C_1 \sum_{i=1}^{N} \alpha_{ij} - C_2 \sum_{i=1}^{N} \overline{T_i}^2 \alpha_{ij}, \quad j = 1 \ldots Z$$

with previously determined weighting factors:

$$C_1 = \frac{\sum_{i=1}^{N} \overline{T_i}^4}{N \sum_{i=1}^{N} \overline{T_i}^4 - \left( \sum_{i=1}^{N} \overline{T_i}^2 \right)^2}$$

and $$C_2 = \frac{\sum_{i=1}^{N} \overline{T_i}^2}{N \sum_{i=1}^{N} \overline{T_i}^4 - \left( \sum_{i=1}^{N} \overline{T_i}^2 \right)^2}, \text{ where:}$$

$\gamma_j$ is the correction factor;

$\alpha$ is a filter factor; and $\overline{T}_i$ is the rpm range.

6. In an adaptation method for correcting tolerances of a transducer wheel which includes:

scanning spacings between a number of mutually spaced apart teeth of the transducer wheel with a pickup furnishing a pulse train, measuring a chronological spacing of the pulse train for each tooth or for a segment encompassing a plurality of teeth, and correcting the chronological spacing in overrunning operating states of an engine, the improvement which comprises:

calculating a mean tooth time from currently measured tooth time values or segment time values;

calculating a differential variable in accordance with the equation:

$$T_{diff}(n) = \frac{T(n) - 2T(n-1) + T(n-2)}{\overline{T}}, \text{ in which:}$$

$T_{diff}(n)$ is the differential variable, T(n) is the currently measured tooth time values or segment time values, and $\overline{T}$ is the mean tooth time;

determining an rpm range in which the engine is operating and defining an ascertained rpm range;

ascertaining an adaptation factor for each tooth depending on the ascertained rpm range;

correcting a $j^{th}$ tooth difference in an $i^{th}$ rpm range with the differential variable defining corrected adaption factors;

calculating a correction factor for each tooth or each segment from the corrected adaptation factors; and correcting a $j^{th}$ tooth time value with the correction factor for each tooth.

7. The method according to claim 6, which comprises calculating the corrected adaptation factors by the equation:

$$b_{ij,new} = (1-\alpha)b_{ij,old} + \alpha(T_{norm}(n)),$$

in which:

$\alpha$ is a filter factor determining an adaptation rate and noise suppression and $0<\alpha<1$;

$b_{ij,old}$ is the adaptation factor for each tooth;

$b_{ij,new}$ is the corrected adaptation factor for each tooth; and $T_{norm}(n)$ is a standardized tooth time fluctuation.

8. The method according to claim 6, which comprises carrying out the scanning step by scanning spacings between teeth of a crankshaft transducer wheel of the engine.

9. The method according to claim 6, which comprises defining an rpm range in which the engine is already operating at the mean tooth time.

* * * * *